United States Patent [19]

Graswinckel

[11] 4,284,348
[45] Aug. 18, 1981

[54] ORIGINAL TRANSPORT SYSTEM FOR COPYING APPARATUS

[75] Inventor: Julius V. C. Graswinckel, Arcen, Netherlands

[73] Assignee: Oce-Nederland B.V., Venlo, Netherlands

[21] Appl. No.: 76,782

[22] Filed: Sep. 18, 1979

[30] Foreign Application Priority Data

Sep. 18, 1978 [NL] Netherlands .................. 7809451

[51] Int. Cl.³ .......................................... G03B 27/62
[52] U.S. Cl. ................................. 355/75; 271/275; 355/3 R
[58] Field of Search ............... 355/3 R, 8, 75; 198/500; 271/275

[56] References Cited

U.S. PATENT DOCUMENTS 3,863,912  2/1975  Korff ..................................... 271/245
4,184,765  1/1980  Breuers ................................. 355/75
4,194,837  3/1980  Tani et al. ............................. 355/75

OTHER PUBLICATIONS

IBM Technical Disclosure Bulletin, vol. 17, No. 9, Feb. 1975 "White Conductive Document Feed Belt" by J. D. Froula.

Primary Examiner—Fred L. Braun
Attorney, Agent, or Firm—Albert C. Johnston; Ronald A. Clayton

[57] ABSTRACT

Apparatus for transporting sheetlike originals past an exposure plate (10) of a copying apparatus, of the kind in which a flight of at least one endless belt (25) is driven over the exposure plate, is provided with a device (80) for applying a solid abherent material (85) to that surface of the belt (25) which comes into contact with the exposure plate (10).

20 Claims, 4 Drawing Figures

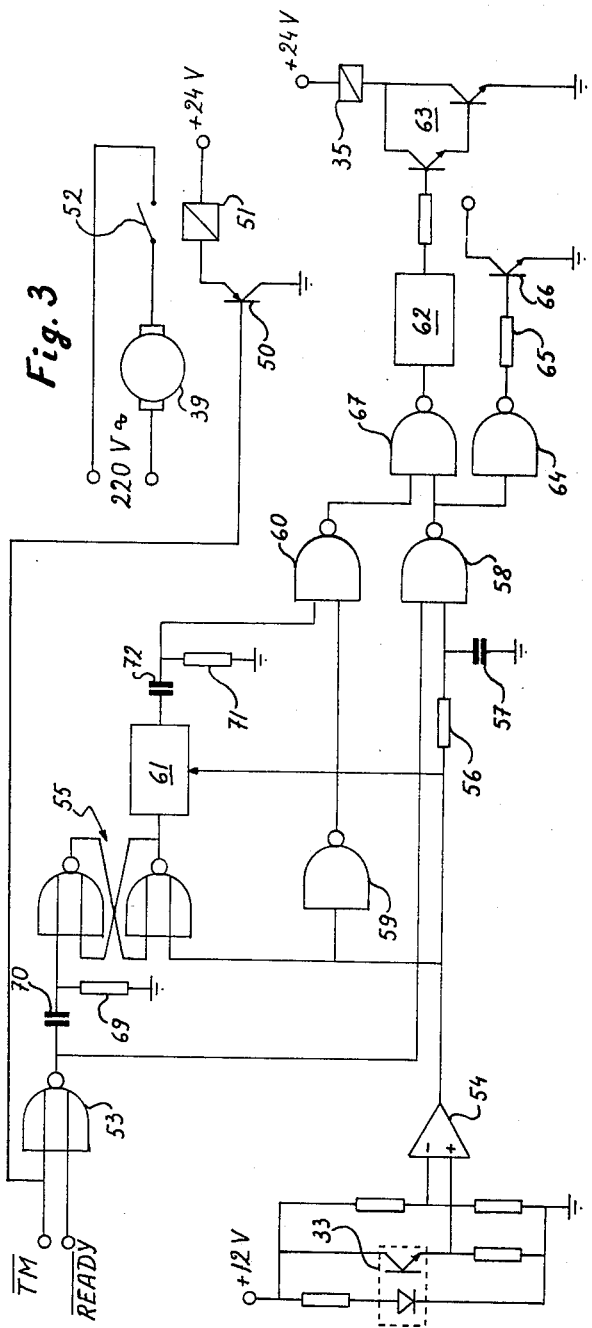
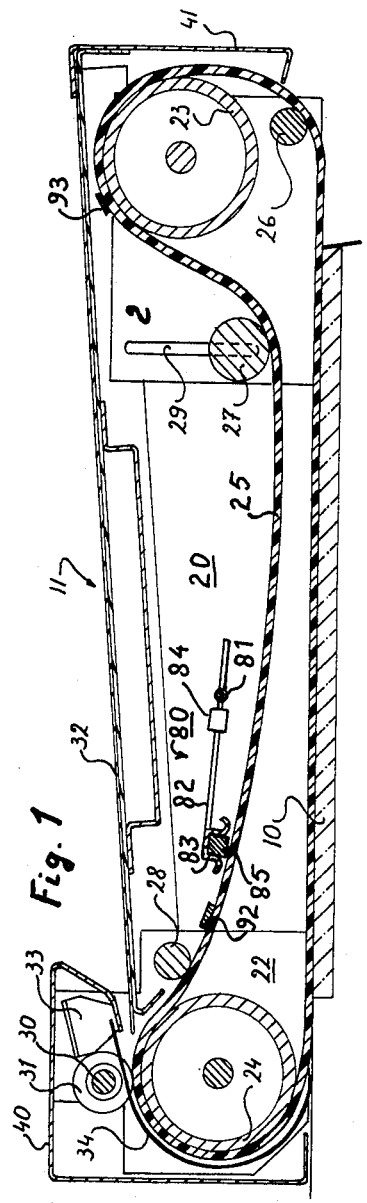

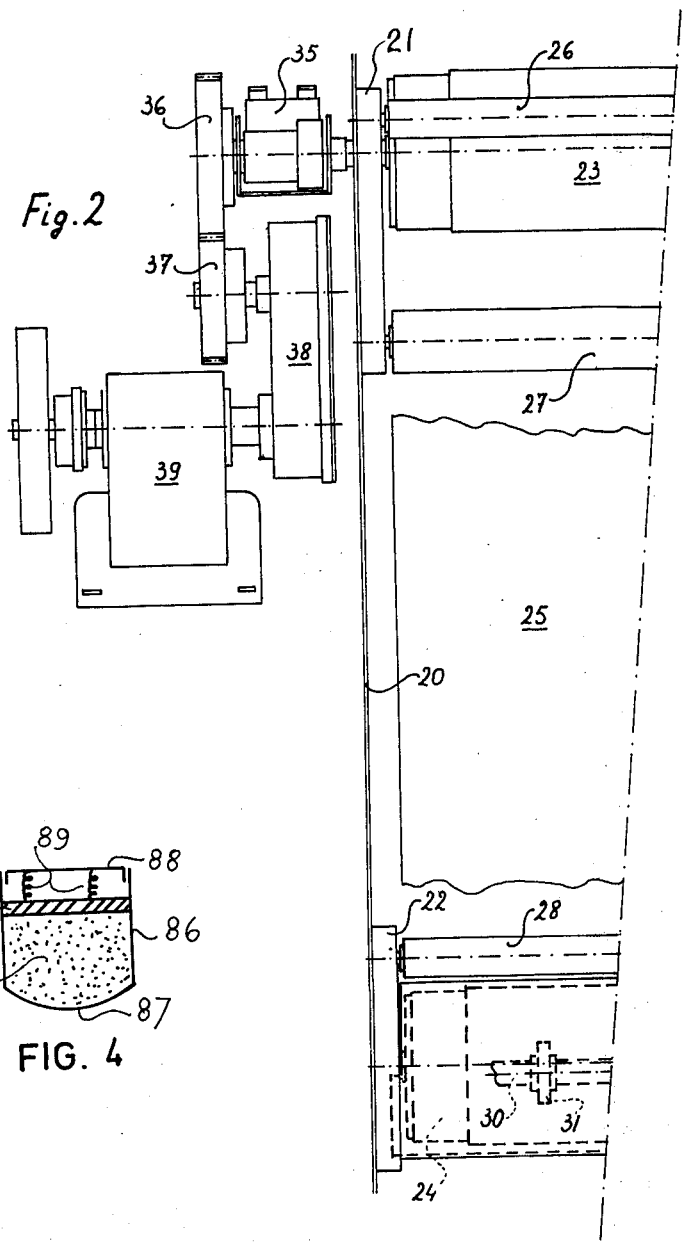

ORIGINAL TRANSPORT SYSTEM FOR COPYING APPARATUS

This invention relates to an apparatus for transporting sheetlike originals past an exposure plate of a photocopying apparatus of a kind in which at least one traveling endless belt is driven over at least two rollers, with a part of the belt length extending past the exposure plate.

An apparatus of that kind is disclosed in U.S. patent application Ser. No. 895,371 filed Apr. 7, 1978, now U.S. Pat. No. 4,184,765, and includes a wide endless belt made of an elastic material having a white, highly reflective surface that is driven to convey an original carried on the belt surface over an exposure plate of a copying apparatus.

The belt has a smooth surface for carrying the original so that the image of that portion of the belt not covered by the original is not visible on a copy. However, since the belt has a smooth surface a great portion of the surface may come into contact with the exposure plate. Consequently the belt can become triboelectrically charged due to this contact and can, therefore, be attracted to the exposure plate by electrostatic forces. The large driving forces are necessary to overcome the friction force between the belt and the exposure plate and start and keep the belt in motion.

The object of the present invention is to provide an improved apparatus that minimizes the attraction between the belt and the exposure plate so that the disadvantage mentioned above does not occur. This object is achieved in accordance with the invention by providing means for applying a solid abherent to that side of the belt which comes into contact with the exposure plate. In this way attraction between the belt and the exposure plate is greatly reduced or eliminated. However, sufficient frictional force between the belt and the original remains so that the original can be properly conveyed over the exposure plate. An additional advantage is that the belt does not readily attract dirt from the environment and dirt that may nevertheless be picked up by the belt can be easily removed.

In a preferred embodiment of the present invention a specially shaped piece of abherent material is held in contact with the surface of the belt that comes into contact with exposure plate and carries originals. The preferred embodiment provides a simple construction in which separate containers for liquid or powder with dosing means are not required.

In the preferred embodiment of the invention the abherent is white. In this way the belt continues to have a uniform white outer surface again so that the image of this surface, either when not covered by the original or when visible because the original is transparent, is not undesirably reproduced on the copy.

Also in the preferred embodiment of the invention the abherent material comprises a binding agent. By adding a suitable quantity of binding agent to the material, the solidity of the shaped piece of material and the speed at which the material is transferred to the belt may be made compatible with the material of the belts.

Means are also provided in the preferred embodiment for adjusting the contact pressure between the shaped piece of material and the belt. In this way the shaped piece of material can be made to come into contact with the belt over its whole width.

The above-mentioned and other aspects, objects and advantage of the present invention will be further understood from the following description of the preferred embodiment in which reference is made to the accompanying drawings.

FIG. 1 is a schematic vertical cross-sectional view of the apparatus for transporting originals past an exposure plate in a photocopying apparatus according to the invention.

FIG. 2 is a bottom view of a portion of the apparatus in which the belt has been partially broken away.

FIG. 3 is a schematic diagram of the electrical circuit for controlling the operations of the apparatus of the present invention.

FIG. 4 is a vertical cross-sectional view of a second embodiment of the present invention showing different means for mounting the abherent material.

As shown in FIG. 1, a copying device which may be, for instance of the electrophotographic kind, is equipped with an exposure plate 10 upon which an original is positioned to be exposed and thereafter reproduced. Apparatus generally indicated at 11 is provided in accordance with the present invention for handling and carrying originals to the exposure plate 10.

The apparatus 11 comprises two parallel frame plates 20 between which its functional parts are mounted. First and second pairs of bearing blocks 21 and 22, respectively, are mounted against the inner, or confronting, sides of the plates 20. Only one bearing block of each pair is illustrated in the drawing. A roller 23 is mounted and freely rotatable in the bearing blocks 21, and a roller 24 is mounted and freely rotatable in the bearing blocks 22. An endless belt 25 is positioned about and extends between the rollers 23 and 24 so that the lower flight of this belt extends over the plate 10 and preferably somewhat beyond the respective plate edges nearer to the rollers 23 and 24.

The belt 25 is further positioned and is tensioned by freely rotatable rollers 26, 27 and 28 which also are mounted in the bearing blocks of the frame plates. The rollers 26 and 28 serve as guide rollers. Roller 26 is positioned at a location outside the edge of the plate 10 near roller 23, where it lengthens the reach of the lower belt flight beyond that edge.

At least one of the belt positioning rollers, for instance the roller 27 which bears downward against an upper flight of the belt 25, is supported displaceably relative to the frame of the device 11 as by engagement of the shaft of roller 27 in elongated openings such as the slots 29 provided in the bearing plates 21. Thus, the position of the roller 27 and correspondingly of the belt will change in response to a change of the position or of pressure against the lower flight of the belt.

The belt 25 is made of an elastic material, such as rubber or a synthetic elastomer, and it has a white, suitably reflecting outer surface.

A portion of the belt 25 extending over the roller 24 cooperates at its outer side with a pressing roller to form a nip for feeding a sheetlike original to the exposure plate 10. The pressing roller comprises freely rotatable rubber discs 31 mounted on a shaft 30. The shaft 30 is supported in slots (not shown) so that the rubber discs 31 are pressed down against the belt 25 and the roller 24 by the weight of the shaft 30 and discs 31.

A feed table 32 for positioning sheetlike originals in readiness to be copied extends from a location adjacent the nip between the discs 31 and the roller 24 to a location over the roller 23. The feed table 32 is provided with an abutment or stop (not shown) along a side thereof for positioning the original laterally. A photoelectric detecting element 33 is mounted at a location just ahead of and above the nip between the discs 31 and the roller 24, so that this element will sense the presence or absence of an original in ready position on the feed table and will emit a signal correspondingly. A guide plate 34 extends about the roller 24 in parallel relation to its circumference from a location at the original feeding nip up almost to one edge of the exposure plate 10.

The shaft of the roller 23 extends outside the frame formed by the plates 20 at one side of this frame (see FIG. 2), where it is connected with the output shaft of an electromagnetic coupling 35, the input shaft of which has a gear 36 fixed thereto. The gear 36 engages with a gear 37 which is connected through a speed reduction gearbox 38 with an electric motor 39. Thus, the roller 23 is driven to drive belt 25 when both the motor 39 and the coupling 35 are energized.

The apparatus 11 is further provided with covering or housing plates, two of which are illustrated at 40 and 41 in FIG. 1. The covering plates are not shown in FIG. 2 for the sake of clarity.

A device 80 is mounted within the frame plates adjacent the outer surface of the upper flight of the belt 25 and, in accordance with the invention is adapted to apply an abherent material to the outer surface of the belt which ultimately comes into contact with the exposure plate. The device 80 comprises two bearing housings 81, each of which is mounted on the inner side of one frame plate 20 at each side of the belt 25. A frame, which is generally U-shaped in top view, is mounted for pivoted movement on bearings secured in the bearing housings 81. Specifically, the U-shaped frame comprises a first leg 82, which is mounted on bearings in the bearing housing 81 shown in FIG. 1, a second leg 83, which extends perpendicularly to the first leg 82 and to the plane of the Figure, and a third leg (not shown) that is mutually parallel to the leg 82 and is supported on bearings mounted in the other of the bearing housings (also not shown). Small slidable weights 84 may be installed on the first and third legs of the U-shaped frame. The leg 83 defines a channel in which a bar of abherent material is clamped in position to contact the outer surface of the belt 25. The pressure with which the bar 85 contacts the surface of the belt may be adjusted by sliding small weights 84 to different positions. If desired, such small weights 84 can be slidably mounted on the first and third legs of the U-shaped frame to both the left and right of the bearing housings 81 as seen in FIG. 1. This arrangement of weights provides fine adjustment of the pressure with which the bar 85 contacts the surface of the belt.

The bar 85 is made of a solid white abherent material compressed with a binding agent. Suitable abherent materials include talc (magnesium silicate), mica, diatomaceous earth and metal soaps such as for instance the stearates of calcium, lead, magnesium, aluminium and zinc. Accordingly, as used in this specification and the concluding claims, the term "abherent" is intended to mean a dry solid lubricant or antifriction agent which prevents one surface from adhering to another. Suitable binding agents include polyethylene, bariumsulphate, calciumsulphate, calciumcarbonate, chalk, gypsum, calcite, dolomite and graphite.

In the preferred embodiment, the bar 85 has a rectangular cross section with dimensions of approximately 7 mm by 7 mm and comprises approximately 75 to 84 percent, by volume, of talc and 16 to 25 percent, by volume, of gypsum. These components are mixed in powder form with each other and with water and are subsequently molded into the bar shape described above. When mounted in the U-shaped frame on which weights 84 are adjusted so that the bar 85 contacts the outer surface of the belt with pressure of between 15 and 25 grams per square centimeter, an amount of abherent material is transferred to the belt which prevents the belt and exposure plate from undesirably adhering to one another. Other combinations of the above-mentioned abherent materials and binding agents performed well when the bar 85 contacted the outer surface of the belt with pressures of between 4 and 45 g/cm$^2$.

FIG. 4 illustrates another embodiment of a bar 85 abherent material in accordance with the present invention. This bar 85 comprises an elongated housing 86 generally rectangular in cross section, which is open at its opposing longitudinal sides. One of the open longitudinal sides is enclosed by a porous layer of material 87, such as, for instance, silk cloth. The other open longitudinal side is enclosed by a cover 88. A pressure element 90 is mounted within the housing 86 and abherent material 91 in powder form is introduced between the element 90 and the porous layer 87. Compressed coiled springs 89 are mounted within the housing between the element 90 and the cover 88. Accordingly, the pressure element 90 is urged toward the porous layer 87 to press powdery abherent material 91 through the pores of the layer 87 for transfer to the belt. The housing 86 can be mounted in the leg 83 of the U-shaped frame in the same way as was the bar 85.

The amount and uniformity of pressure with which the bar 85, in either of its embodiments, contacts the belt can be adjusted by varying the positions of the small weights 84 on the associated legs of the U-shaped frame. However, the pressure required to insure that abherent material is uniformly transferred to the belt across its width may cause excess amounts of such material to be transferred to the belt per time unit. Therefore, in order to limit the quantity of abherent material reaching the exposure plate 10, a strip of soft and porous material 92 such as foam rubber is mounted to contact the belt across its entire width at a location between the bar 85 and the exposure plate 10 after the belt has passed the bar.

A second strip of soft and porous material 93 such as foam rubber is mounted to contact the belt at a location after it passes over the exposure plate but before it reaches the bar 85. This strip 93 removes dirt that can be deposited on the exposure plate by the originals transported thereto and which can be, in turn, picked up by the belt from the exposure plate.

When the outer surface of the belt is a silicone polymer, the application of an abherent material to the belt has another important function in addition to preventing the belt and exposure plate from adhering to one another. As is known, silicone polymers readily pick up ink images, particularly images printed with viscous inks, from the side of the original opposite that which actually carries the image to be copied. Because of the characteristic of silicone polymers, the white outer polymeric surface of such belts often becomes dirty. Therefore, grey or black stains are reproduced on copies when originals are smaller than the copy paper used so that portions of the belt are exposed and copied, or when transparent or translucent originals are copied. The abherent material applied to the belt, however, prevents the belt from picking up ink images very effectively and, therefore, maintains suitable whiteness of the outer surface of the belt.

In the use of the apparatus 11 for exposing sheetlike originals the operator places a sheetlike original on the feed table 32 and presses this original by hand into the nip between the belt portion on roller 24 and the discs 31. The operator then operates the print switch of the copying apparatus. As will be explained below, the motor 39 is now started and the coupling 35, is also energized, as a result of which the original is introduced along the guide 34 and onto the exposure plate 10, and is pressed flat on the plate 10 by the lower flight of the belt 25. As soon as the leading edge of the original reaches a predetermined copying position on plate 10, the coupling 35 is de-energized to stop the belt movement, after which the copying cycle is started. After the original has been exposed for the last time in a copying cycle, the coupling 35 is again energized to drive the belt which then moves the original off the plate 10 for delivery of the original into a receiving tray located below the roller 26. If in the meantime a new original has been laid ready on the feed table 32, the new original is automatically introduced while the previous original is being removed from the exposure plate.

In order to stop the original at an exact location on the plate 10, the roller 24 makes a certain number of revolutions upon each energization of the coupling 35. In the embodiment shown it is assumed that by making two revolutions the roller 24 and belt 25 will move an original through a distance which corresponds to the distance between the nip at the discs 31 and a so-called zero-point or desired copying position on the exposure plate.

The complete operation will be further understood from the following description of the electric control circuit, in which reference is made to FIG. 3.

For the control of the apparatus 11 some signals generated by the copying apparatus itself are utilized, for which reason the apparatus 11 is connected electrically with the copying apparatus. A first signal generated by the copying apparatus is the signal TM, which has a value of zero as long as the copying apparatus is not making a copying cycle. As soon as a copying cycle is started, upon operating the print switch of the copying apparatus, TM becomes one, and it retains this value until the last copy of a copying cycle has left the copying apparatus. In practice, this means that the signal TM becomes one for a short time, for instance 0.5 seconds, before the exposure starts and becomes zero again some time, for instance 3 seconds, after the exposure of the last copy of a cycle has been ended.

A signal READY having a value of one exists when the apparatus is in condition to have a new original laid onto the exposure plate 10. Consequently, this signal becomes zero as soon as the print switch is operated, and it becomes one again immediately after the exposure of the last original of a copying cycle has been ended. In the circuit of FIG. 3 the inversed signals of the signals $\overline{TM}$ and $\overline{READY}$ are represented.

The signal TM is conducted to the base of a transistor 50, the emitter of which is connected via a relay coil 51 with a terminal supplying a control voltage of, for instance, +24V. The collector of the transistor 50 is grounded. The relay coil 51 has a normally open contact 52 which is connected in series with the motor 39 so that the motor will be connected with an alternating current source, for instance of 220V, when the relay coil 51 is energized.

The signals TM and READY are combined in a NOR-gate 53. The detecting element 33 comprises a LED and a phototransistor, the latter being connected in a bridge circuit which is connected with an operational amplifier 54.

The output of the NOR-gate 53 is connected via an RC-circuit 69, 70 with the reset input of a flip-flop 55, of which the set input is connected with the output of the operational amplifier 54. The output of this operational amplifier is connected, via a delay circuit consisting of a resistor 56 and a capacitor 57, with an input of a NAND-gate 58, the other input of which is connected with the output of the NOR-gate 53. The output of the operational amplifier 54 is also connected via an invertor 59 with one input of a NAND-gate 60, of which the other input is connected with the set output of the flip-flop 55 via an RC-circuit, 71, 72 and a monostable multivibrator 61.

The monostable multivibrator 61 has a delay time almost equal to the time which passes between the end of the exposure for making a copy and the delivery of that same copy by the copying apparatus. The monostable multivibrator 61 is of the type which can be reset, and its reset input is connected with the output of the operational amplifier 54.

The outputs of the gates 58 and 60 are combined in a NAND-gate 67 the output of which is connected with a monostable multivibrator 62, which in its turn is connected through an amplifier 63 with the electromagnetic coupling 35. The coupling 35 in the embodiment shown is desirably a one revolution coupling, i.e., upon each energization the coupling makes one revolution and then de-energizes itself. Since in the operation described the roller 24 must make two revolutions in order to bring an original into copying position, the monostable multivibrator 62 in the energizing circuit of the coupling 35 is provided with such a delay time that the coupling remains energized during about 1.5 revolution.

The output of the gate 58 is connected via an invertor 64 and a resistor 65 with the base of a transistor 66, of which the emitter is grounded and the collector is connected with the print switch of the copying apparatus, so that when the transistor 66 becomes conductive an energization of the print switch is simulated in the control circuit of the coping apparatus.

When a sheetlike original is laid ready on the table 32, first the detector 33 is energized, as a result of which a signal is generated in the output of the operational amplifier 54. This causes the set output of the flip-flop 55 to become zero but has no further consequence, as the monostable multivibrator 61 is triggered only by rising wave-parts of a pulse. When subsequently the print switch of the copying apparatus is operated, the signal $\overline{TM}$ becomes zero, and the signal $\overline{READY}$ becomes one. When the signal $\overline{TM}$ becomes zero, this causes the transistor 50 to become conductive, as a result of which the relay coil 51 is energized so that the contact 52 is closed and the motor 39 is started.

In the embodiment illustrated it is assumed that when operating the print switch the signal $\overline{TM}$ becomes zero before the signal $\overline{READY}$ becomes one. When this is not the case in practice, this condition can be obtained by incorporating a delay unit, for instance in the form of an RC-circuit, in the circuit of the signal $\overline{READY}$. Thus a short positive pulse is generated in the output of the gate 53 by operating the print switch. This pulse has no influence on the signal in the set output of the flip-flop 55, as the output signal of the amplifier 54 still is one. By combination of the output signals of the gate 53 and the amplifier 54, a short zero pulse is generated in the output of the gate 58, as a result of which a short positive pulse is generated in the output of the gate 67. By the rising wave-part of this pulse the monostable multivibrator 62 is started, and thus the coupling 35 is energized. The original then is introduced to the exposure position on the plate 10, being moved there with the belt 25 by rotation of the roller 24.

After the trailing edge of the original has passed the detecting element 33 the output of the amplifier 54 becomes zero, but this has no direct further consequence. The original is exposed, and when the last exposure of the original is finished the signal READY becomes zero. Thus the output of the gate 53 becomes one. Through the RC-circuit 69, 70 a short positive pulse is transmitted, so that the set output of the flip-flop becomes one and the monostable multivibrator 61 is started. If no new original has been laid ready on the feed table 32, the monostable multivibrator 61 will generate a pulse having a length of about 3.5 seconds. When the output of the monostable multivibrator 61 is reset to zero, a short pulse is transmitted via the RC-circuit 71, 72, so that in the output of the gate 60 a short zero pulse is generated. This pulse starts the monostable multivibrator 62 via the gate 67, with the result that the coupling 35 is energized and the exposed original is removed from plate 10.

When a new original is laid ready on the feed table 32 while an original is being exposed, so before the signal READY has been reset to zero, this causes a signal to be generated in the output of the amplifier 54. When subsequently the exposure of the original lying on the plate 10 is ended, the signal READY will become zero, as a result of which a signal one is generated in the output of the gate 53. This signal again has no influence on the condition of the flip-flop 55, as the set input of this flip-flop is still one. However, in the way described above, a zero signal is generated in the output of the gate 58, which signal starts the monostable multivibrator 62 via the gate 67 and consequently energizes the coupling 35. In this way the processed original is transported away and at the same time the new original lying ready is introduced. As the same time a signal is generated via the gate 64 which simulates an operation of the print switch in the copying apparatus. Thus the exposure of the new original is started automatically.

When a new original is laid ready on the feed table after the exposure of the preceding original has already been ended but before that original has been removed, the output of the amplifier 54 becomes one. As the output of the gate 53 is already one, the output of the gate 58 is consequently set to zero. It should be noted that the output signal of the amplifier 54 is transmitted to gate 58 with some delay via the RC-circuit 56, 57, in order to be sure that the new original has arrived in the nip between the discs 31 and the roller 24. However, before the signal is generated in the output of the gate 58, the monostable multivibrator 61 is reset, and the resulting signal of the monostable multivibrator 61 is blocked in the gate 60 by the output signal of the amplifier 54, which output signal is transmitted via the gate 59. The result is that, after the expiration of the delay time caused by the RC-circuit 56, 57, the original which has been laid ready is immediately introduced, and also a simulation of an operation of the print switch is generated.

What is claimed is:

1. In an apparatus for transporting sheetlike originals past an exposure plate of a copying apparatus that includes at least two rotatably supported rollers, at least one endless transport belt extending about and positioned by said rollers, said belt having a lower flight that extends over said plate with one surface thereof coming into contact with said plate, and means for driving said belt, the improvement which comprises means for applying solid abherent means to said one surface of said belt which comes into contact with said exposure plate.

2. Apparatus according to claim 1, said abherent means being in the form of a shaped bar of material, and said applying means mounting said bar to contact said one surface of said belt.

3. Apparatus according to claim 1 or 2, wherein said abherent means is white.

4. Apparatus according to claim 1 or 2, wherein said abherent means comprises an abherent material selected from the group consisting of talc, mica, diatomaceous earth and the metal soaps.

5. Apparatus according to claim 1 or 2, wherein said abherent means comprises an abherent material and a binding agent.

6. Apparatus according to claim 5, wherein said binding agent is selected from the group consisting of polyethylene, bariumsulphate, calciumsulphate, calciumcarbonate, chalk, gypsum, calcite, dolomite and graphite.

7. Apparatus according to claim 5, wherein said abherent material is talc and said binding agent is gypsum.

8. Apparatus according to claim 7, wherein said abherent means comprises from about 75 to about 84 percent talc by volume and from about 16 to about 25 percent gypsum by volume.

9. Apparatus according to claim 1 or 2, further comprising means for adjusting the pressure with which said abherent means contacts said one surface of said belt.

10. Apparatus according to claim 1 or 2, said applying means comprising a pivotably mounted frame, the axis of rotation of which extends laterally across and near said belt.

11. Apparatus according to claim 1 or 2, wherein said applying means mounts said abherent means to contact said one surface of said belt with contact pressure of between about 4 and about 45 g/cm$^2$.

12. Apparatus according to claim 1 or 2, wherein said one surface of said belt comprises a silicone polymer, wherein said abherent means comprises from about 75 to about 84 percent talc by volume and from about 16 to about 25 percent gypsum by volume and wherein said applying means mounts said abherent means to contact said one surface of said belt with contact pressure of between about 15 and about 25 g/cm$^2$.

13. Apparatus according to claim 1 or 2, further comprising means for limiting the quantity of said abherent means applied to said one surface of said belt.

14. Apparatus according to claim 13, said limiting means comprising a piece of foam rubber mounted to contact said one surface of said belt after it is driven past said applying means.

15. Apparatus according to claim 14, said piece of foam rubber being in the form of a strip mounted to extend laterally across the width of said belt.

16. Apparatus according to claim 1 or 2, further comprising means for cleaning said one surface of said belt, mounted to contact said one surface before it is driven past said applying means.

17. Apparatus according to claim 16, said cleaning means comprising a piece of foam rubber mounted to contact said one surface of said belt.

18. Apparatus according to claim 17, said piece of foam rubber being in the form of a strip mounted to extend laterally across the width of the belt.

19. Apparatus according to claim 2 wherein the major axis of said shaped bar of material extends laterally across the width of said belt, perpendicular to the direction of travel of said belt.

20. Apparatus according to claim 19 further comprising means for limiting the quantity of said abherent means applied to said one surface of said belt, said limiting means comprising a strip of foam rubber mounted to extend laterally across the width of and to contact said one surface of said belt after it is driven past said applying means, and means for cleaning said one surface of said belt comprising a strip of foam rubber mounted to extend laterally across the width of and to contact said one surface of said belt before it is driven past said applying means.

* * * * *